US011271629B1

(12) United States Patent
Um et al.

(10) Patent No.: US 11,271,629 B1
(45) Date of Patent: Mar. 8, 2022

(54) HUMAN ACTIVITY AND TRANSITION DETECTION

(71) Applicant: Amazon Technologies, Inc., Seattle, WA (US)

(72) Inventors: Koohyun Um, Sunnyvale, CA (US); Jungtao Liu, Saratoga, CA (US); Ce Zhang, Campbell, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/906,623

(22) Filed: Feb. 27, 2018

(51) Int. Cl.
*H04B 7/06* (2006.01)
*H04W 84/12* (2009.01)

(52) U.S. Cl.
CPC .......... *H04B 7/0626* (2013.01); *H04W 84/12* (2013.01)

(58) Field of Classification Search
CPC ............................ H04B 7/0626; H04W 84/12
See application file for complete search history.

(56) References Cited

U.S. PATENT DOCUMENTS

| | | | | |
|---|---|---|---|---|
| 9,154,560 B2* | 10/2015 | Khorashadi | .......... | G01C 21/206 |
| 9,749,802 B2* | 8/2017 | Cui | .......... | H04W 4/029 |
| 10,083,006 B1* | 9/2018 | Feuz | .......... | G06F 3/167 |
| 2011/0019715 A1* | 1/2011 | Brisebois | .......... | H04B 7/0626 |
| | | | | 375/130 |
| 2017/0212210 A1* | 7/2017 | Chen | .......... | G01S 5/06 |
| 2017/0251340 A1* | 8/2017 | Sanders | .......... | H04W 4/02 |

\* cited by examiner

*Primary Examiner* — Ian N Moore
*Assistant Examiner* — Rushil Parimal Sampat
(74) *Attorney, Agent, or Firm* — Pierce Atwood LLP

(57) ABSTRACT

A system that can determine states of human activity and transitions between those states using wireless signal data. A machine learning model such as a Hidden Markov Model (HMM) may be trained to determine transitions between states of human activity (e.g., static, slow movement, fast movement) using information from wireless signal data, such as channel state information gathered from Wi-Fi signal beacons. Depending on the state of the human activity the system may then cause certain commands to be executed corresponding to the human activity such as turning on a certain configuration of lights, playing certain music, or the like.

20 Claims, 12 Drawing Sheets

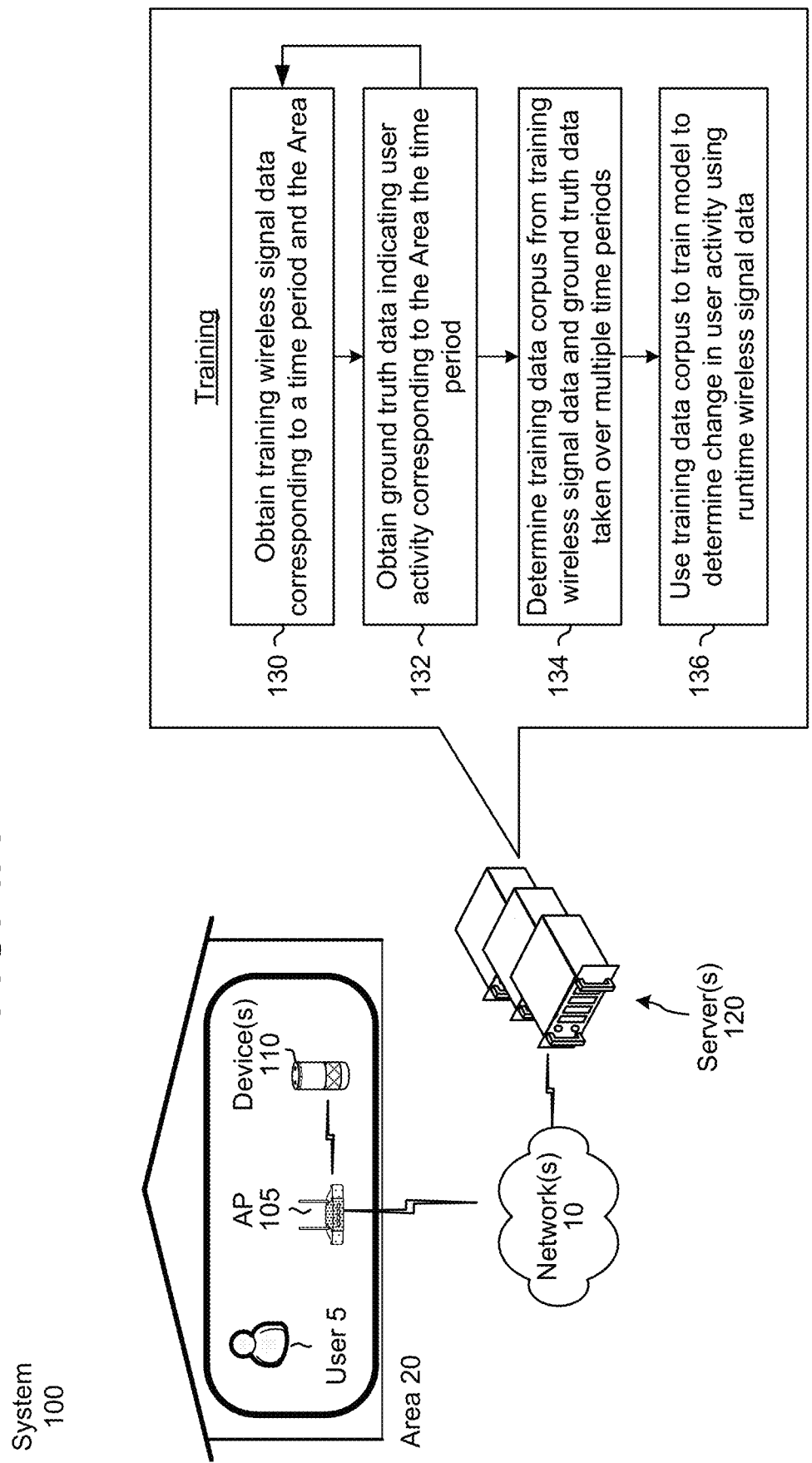

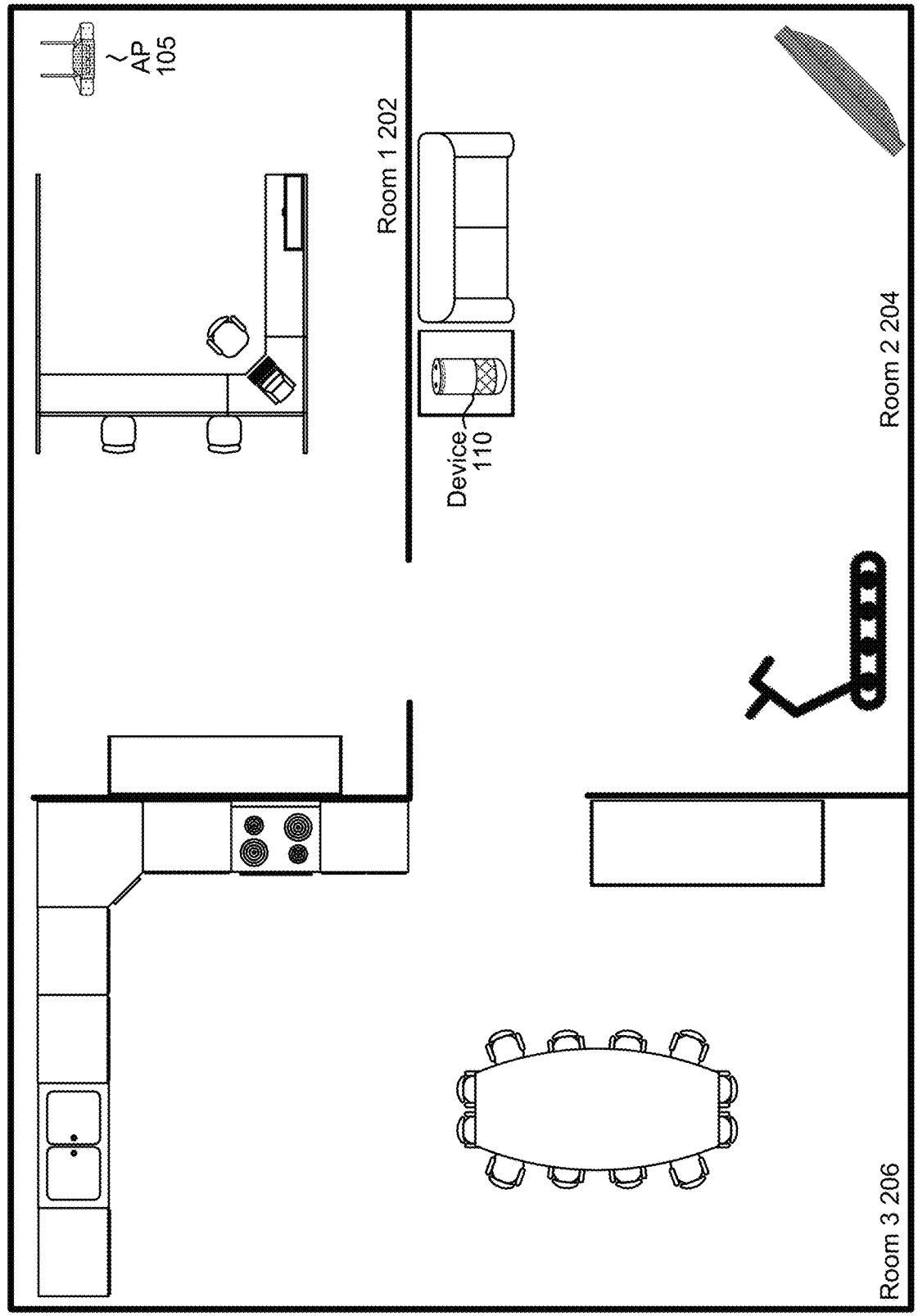

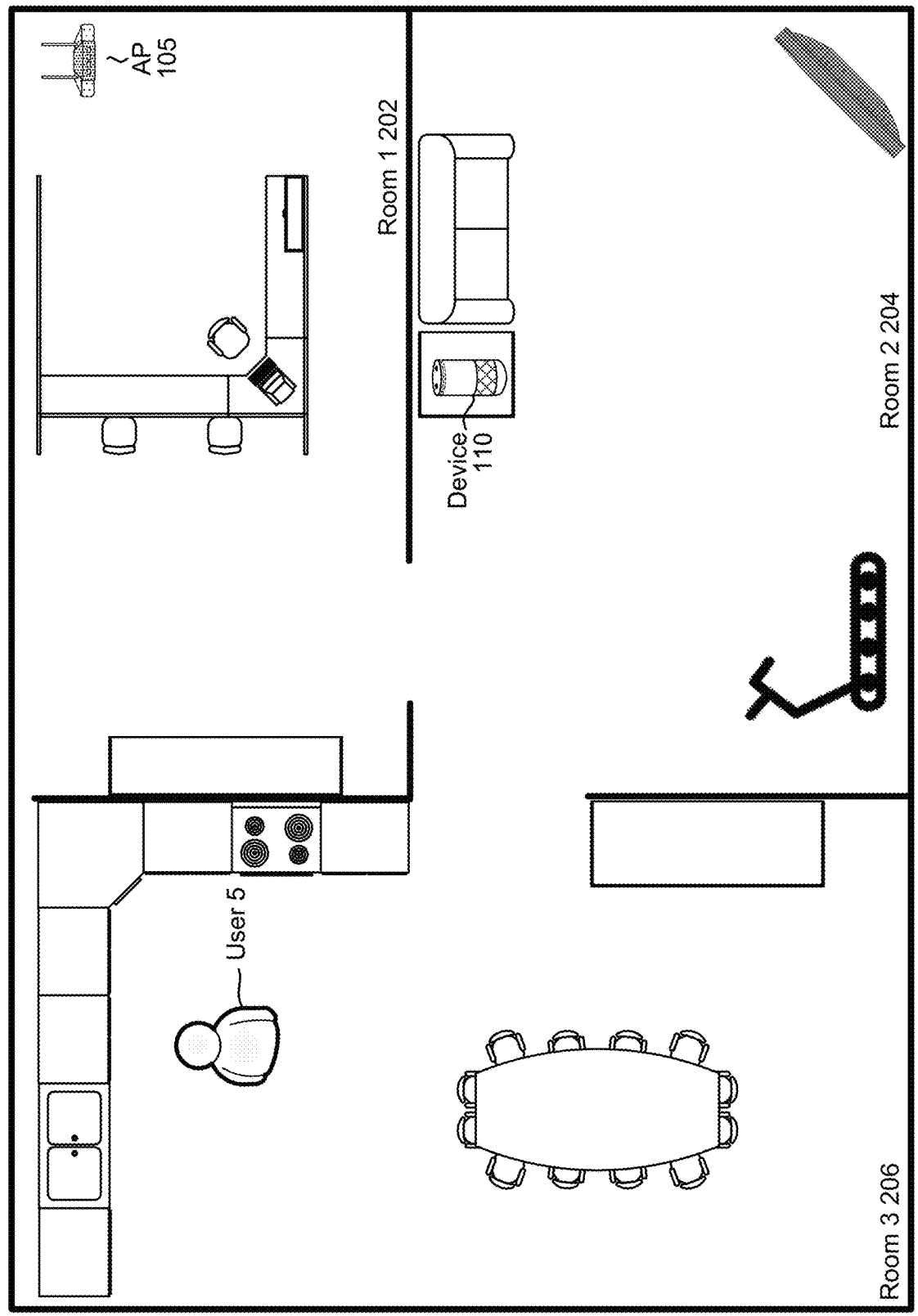

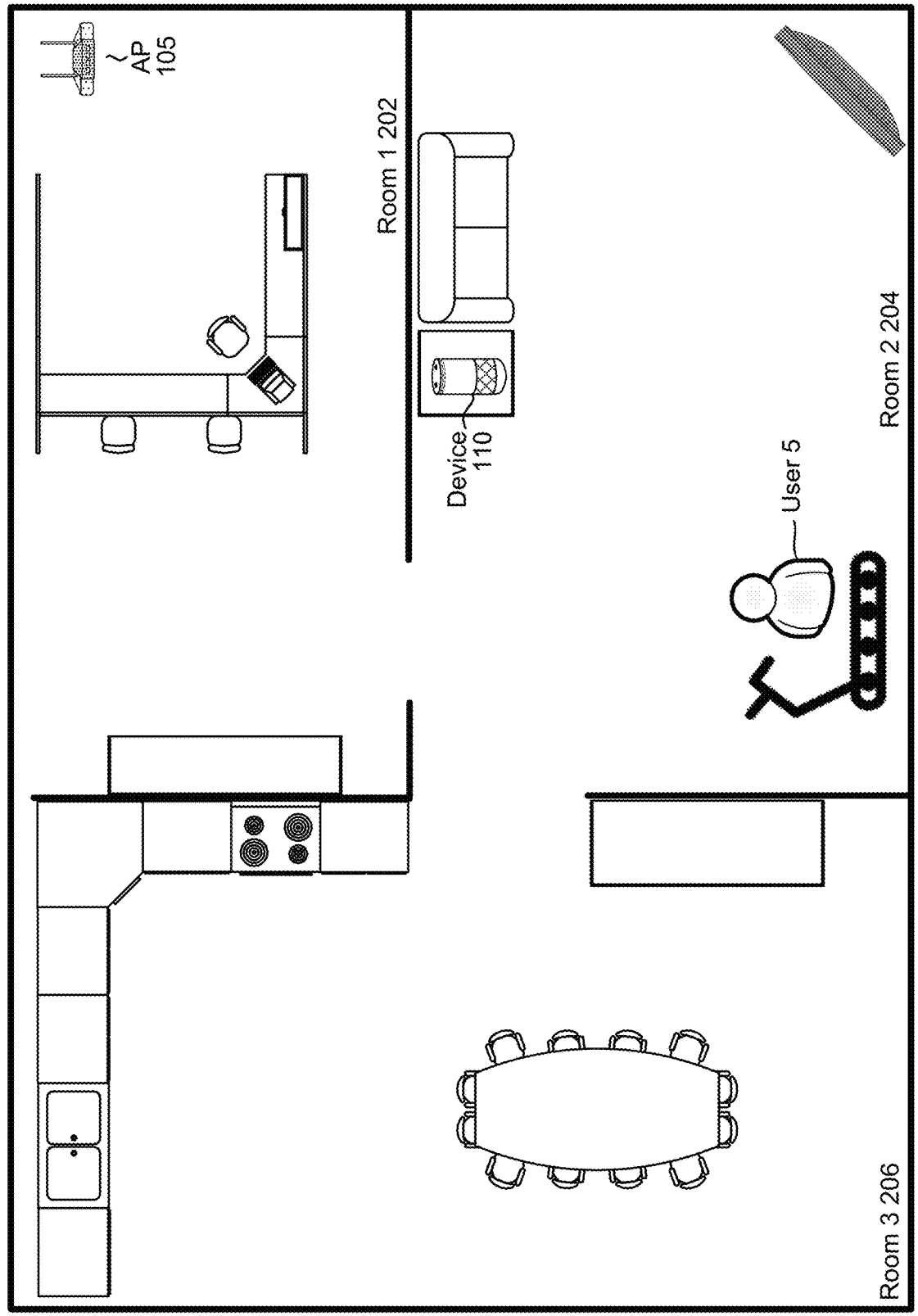

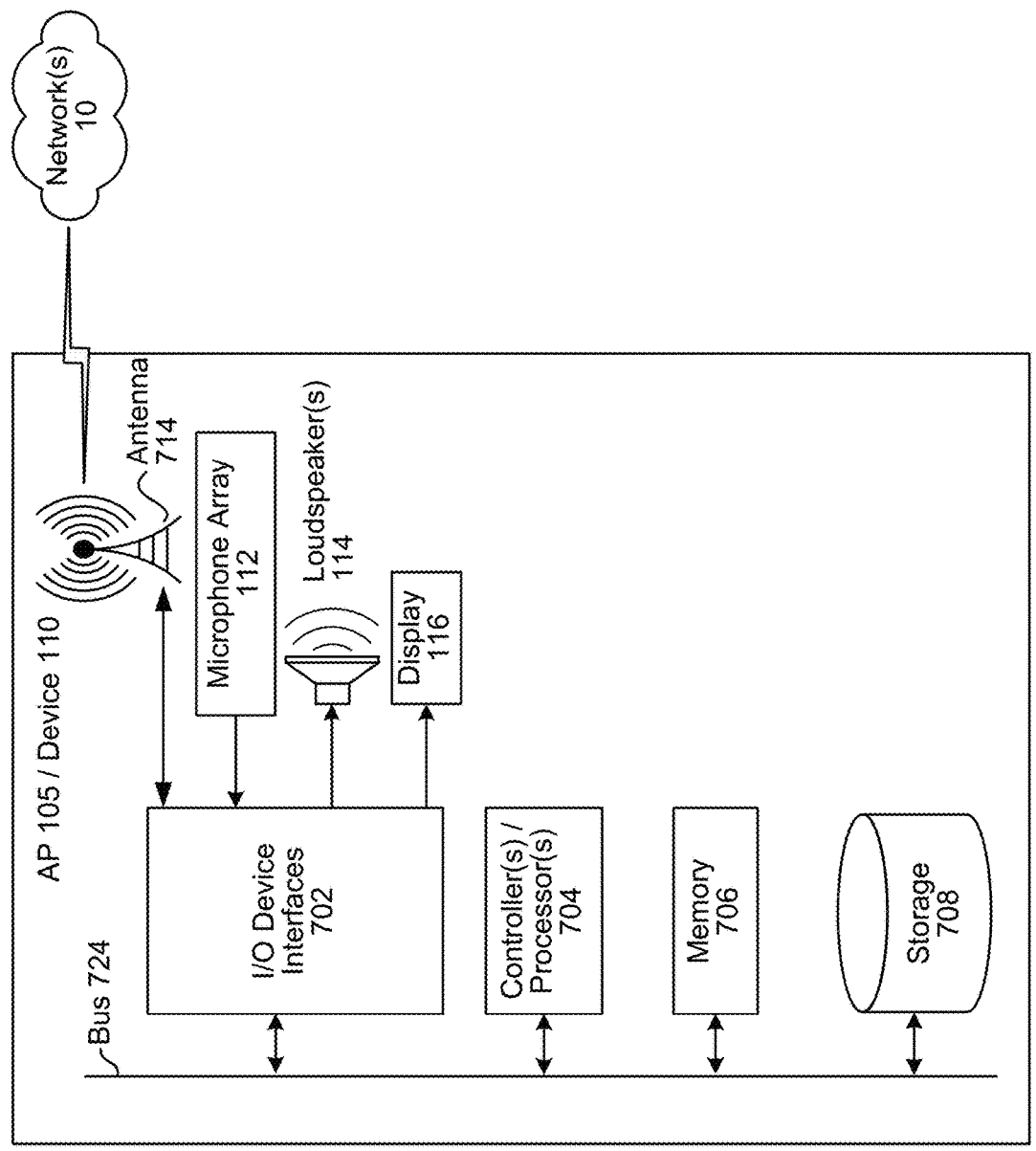

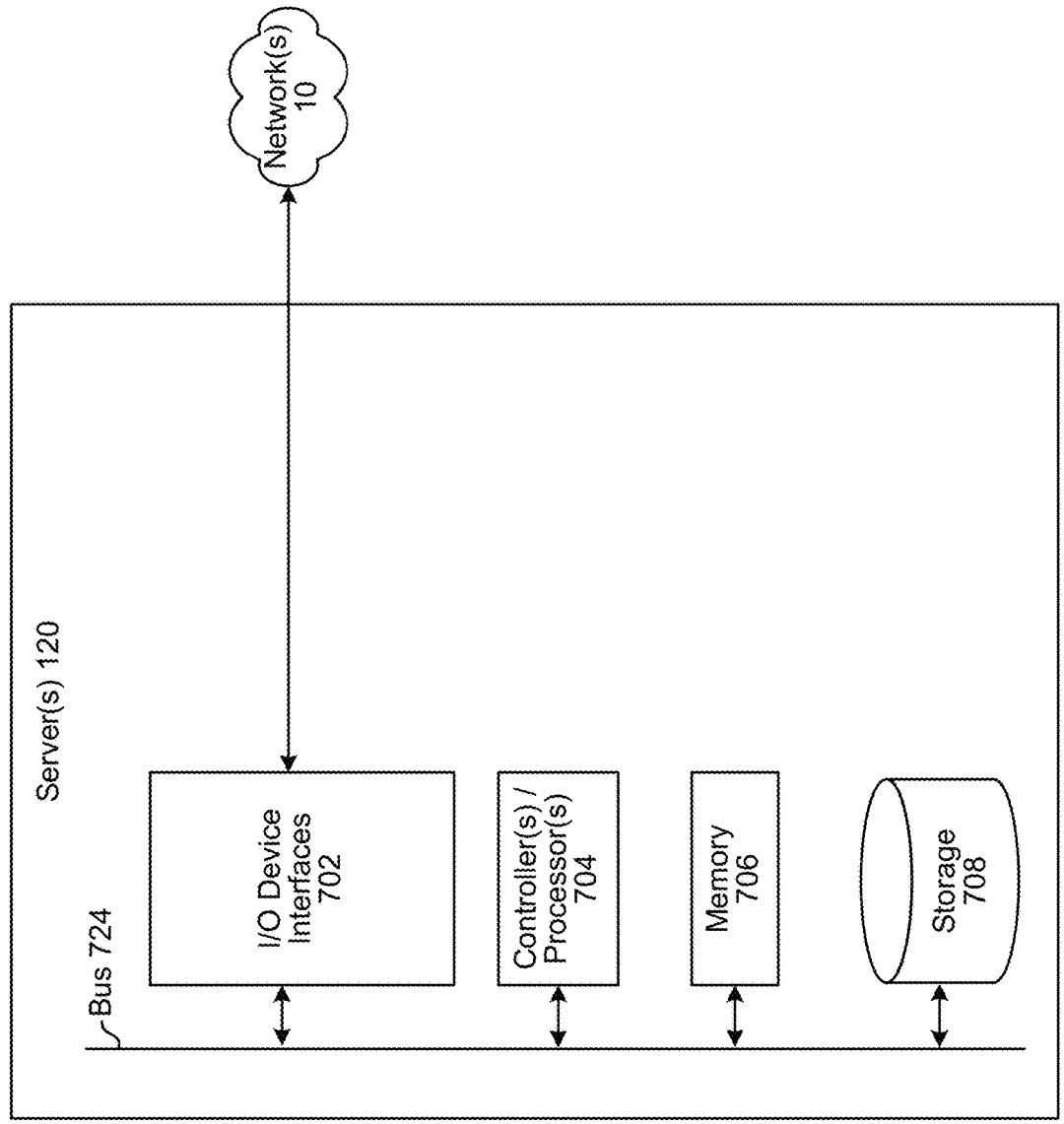

HUMAN ACTIVITY AND TRANSITION DETECTION

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIGS. 1A-1B illustrate a system for determining human activity using wireless signal data according to embodiments of the present disclosure.

FIGS. 2A-2D illustrate an environment where wireless signal data can be used to determine human activity according to embodiments of the present disclosure.

FIG. 7A-7B are block diagrams conceptually illustrating example components of a system according to embodiments of the present disclosure.

DETAILED DESCRIPTION

Figure 1B:
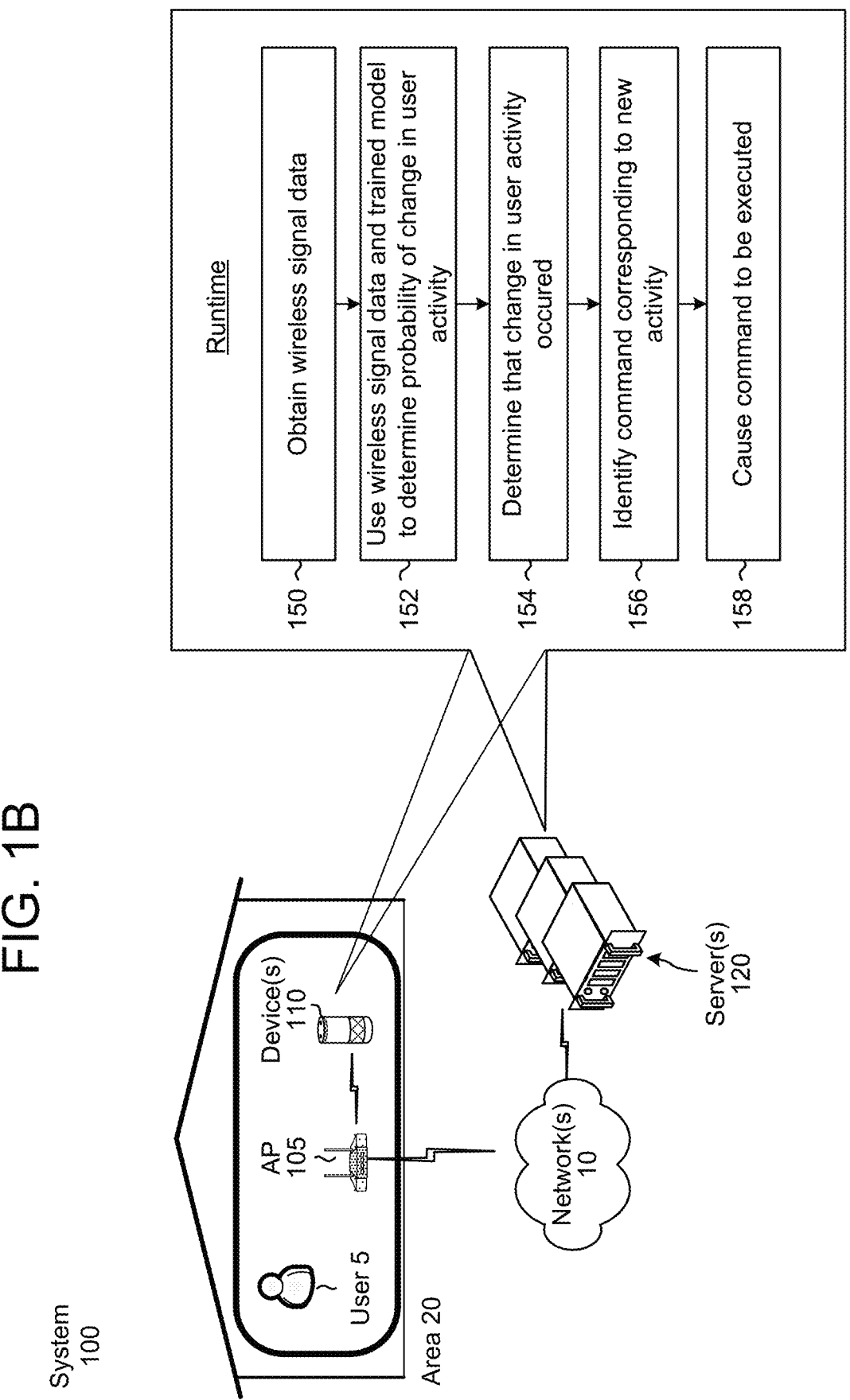

Computing systems can often interact with home appliances or devices to create home automation systems. Such systems may be configured by users to engage in automated or semi-automated activities that reduce the burden on the user to perform certain tasks. For example, speech-controlled systems may allow a user to control light switches, thermostats, or many other home devices with the user's voice, where the audio from the user is captured by a local device, processed using techniques such as automatic speech recognition (ASR) and natural language understanding (NLU) to convert the user's speech into a command instruction that can be sent to a device to perform the task desired by the user (e.g., turning on a light, playing music, etc.).

In some instances, however, it may be desirable for the system to perform certain activities without necessarily receiving an explicit command from the user. If a user has granted prior permission, a system may learn a user's behavior and may attempt to replicate that behavior under certain conditions. For example, if a user repeatedly turns on certain lights when entering a certain room to sit down and read, the system may learn that behavior and may turn on those lights when the user enters the room and sits down without the user expressly commanding the system to turn on those lights. As a further example, if a user repeatedly plays certain music when entering a room and running on a treadmill, the system may learn that behavior and may turn on that music when the user enters the room and starts running on the treadmill without the user expressly commanding the system to play the music.

To enable such automation, it may be desirable for the system to be able to determine what activity a user is engaged in while in a particular space. One approach for doing so may be to analyze images from the environment using computer-vision techniques to analyze the user's behavior. That approach, however, may not be feasible due to the lack of image data, which may require cameras be located in a user's home (or office or other area) which may be expensive and may not be desirable from a privacy perspective.

Another approach may be to use wireless signal information to determine if a user is in a particular area. If a person enters an area, it may cause a fluctuation in a wireless signal such as a Wi-Fi signal (e.g., a wireless local area network (WLAN) signal operated under the conventions of the Institute for Electrical and Electronics Engineers (IEEE) 802.11 specification). Such a fluctuation may be detected by a device (such as a wireless access point (AP)) at or nearby the area. While identifying the presence of a user in an area using a wireless signal is useful, it may be more helpful to an automation or other computing system to determine the user's activity while in the area.

Offered is a system that uses a trained machine learning (ML) model such as a Hidden Markov Model (HMM) or other model to process detected wireless signals to determine a change in a user's activity while in a particular area. For example, a model may input wireless signal data and determine from the wireless signal data (and potentially other data) whether a user is present in a room, whether the user is static (e.g., not moving), moving slowly (e.g., walking in the room), moving quickly (e.g., running in or through the room, exercising, etc.) or engaged in other form of activity in the room. Using an indication of activity output by the trained model, the system may perform one or more actions (e.g., turning on lights, playing music, or the like) to improve the user's experience.

The mode may be trained on a universe of training data that includes many known examples of wireless signals/wireless signal fluctuations along with ground truth data indicating the user's activity level for those signals/fluctuations. The model may then be trained with that data to determine the likelihood of a transition from one motion state to another (e.g., static to slow moving) given certain wireless signal data and potentially some knowledge of the wireless signal data history (and/or other data). In particular, the model may be trained on (and may be able to process at runtime) information regarding a sequence of activity to determine a likelihood of a certain activity taking place given the activity history and the wireless signal data.

FIG. 1A illustrates training of a machine learning model to detect transitions of user activity using wireless signal data. Although the figures and discussion of the present disclosure illustrate certain operational steps of the system in a particular order, the steps described may be performed in a different order (as well as certain steps removed or added) without departing from the intent of the disclosure.

As shown in FIG. 1A, a system 100 may include one or more server(s) 120 and one or more device(s) 110 connected over one or more network(s) 10 (for example through router/access point (AP) 105). The network 10 may be a combination of wired and/or wireless networks. During a training period the system 100 may obtain (130) training wireless signal data corresponding to a time period as well as obtain (132) ground truth data indicating user activity corresponding to the time period. The wireless signal data may correspond to wireless signals sent by the AP 105 and detected by device(s) 110. The ground truth data may include an indication of the activity that was taking place in the area 20 during the time period in question, for example no user being in the area 20, a user being in the area 20 but not moving (e.g., the user being static in the area), a user moving slowly in the area 20 or a user moving quickly in the area 20. Other different activity labels may also be determined/obtained depending on the training configurations of the system. The system may then repeat steps 130-132 to obtain many different training examples of training wireless signal data and ground truth data. The system may then determine (134) a training data corpus from those many different training examples, which may be taken over multiple different time periods and potentially over multiple different areas and with multiple different devices. As further explained below, the system may then use (136) the training data corpus to train a model to determine a change in user activity using runtime wireless signal data. The system may then store the trained model for operation during runtime. The trained model may be stored so that it may be accessed by server(s) 120 during runtime. The trained model may also be sent to/installed on device(s) 110, or otherwise made available to device(s) 110, so that device(s) 110 may operate the model during runtime.

As shown in FIG. 1B, during a runtime period after the training period, the system may use the trained model to determine that a user has transitioned from a first activity to a second activity. The system may obtain (150) wireless signal data corresponding to the area 20 and to a time period. The wireless signal data may include data captured by one or more device(s) 110, for example beacon data captured during a Wi-Fi beacon. The wireless signal data may include channel state information (CSI), or other data obtained by processing the beacon data (for example by applying filters, domain conversions or other data manipulations). The wireless signal data may also include features calculated from the beacon or wireless data such as a multipath fading reference value, Doppler spread reference value or other data. The system may then user (152) the wireless signal data and the trained model to determine a probability that a change in user activity occurred during the time period. The change may corresponds to a change from a user engaging in a first activity to a user engaging in a second activity. For example, the first activity may be sitting, moving slowly, moving quickly, etc. while the second activity may be a different one of sitting, moving slowly, moving quickly, etc. The system may determine (154) that a change in user activity occurred, for example by determining that the probability is greater than other probabilities (e.g., a probability that no change in user activity occurred), by determining that the probability is greater than a threshold, or through some other operation. The system may then identify (156) a command corresponding to a new activity and then cause (158) the command to be executed. For example, if the system has access to settings or configuration or other data that indicates that a certain command should be performed when activity changes as the system has detected, the system may cause that command to be executed.

Many different kinds of commands may be executed depending on the system. Commands may include operating another device, sending a notification or communication, updating a status indicator in stored data, logging a change in activity, or any other number of actions. For example, if the system is configured to turn on a light when a user goes from not being in a room to being seated in the room and the system determines (154) that particular change in user activity occurred, the system may send a command to the appropriate light to turn on the light, thereby causing the command to be executed. In another example, if the system is configured to play music when a user begins exercising in a room and the system determines (154) that a user has begun moving quickly in the room the system may send a command to a music service or speechlet to begin playing music in the room, thereby causing the command to be executed.

In another example, a command may include creating and/or sending a security notification. For example, if the system detects movement in a room that does not correspond to some likely prior activity (e.g., a window breaking in an otherwise idle room or a user entering a room that is only accessible through another room that has not registered any movement), the system may generate a security notification that can be sent to a device or account to notify a user of potentially unauthorized activity in a location. In another example, a particular room may be indicated as one where fast movement is undesired such that if fast movement is detected, a notification may be created and/or stored.

The device 110, area 20, or other aspect of the system may be associated with a user account or other identifying information. The user account may be associated with preference or other information indicating what commands should be executed in response to detecting a certain activity state or change in activity state. For example, in response to detecting a change from one activity to another, the system may determine that the user account indicates that the change should result in an instruction being sent to the device 110 or to a second device to execute a command (e.g., play music, send a notification, logging an activity, etc. The second device may be a device owned by the same user as the device 110 or may be a second device associated with a service or other application that the user subscribes to or is otherwise associated with the user profile.

As illustrated in FIG. 1B, the operations may be performed by a combination of the device(s) 110 and the server(s) 120. In one configuration, all the steps 150-158 may be performed by device(s) 110, which is configured to both operate the trained model to determine changes in user activity and to cause the command to be executed. In another configuration, all the steps 150-158 may be performed by the server(s) 120 where one or more device(s) 110 send beacon data, wireless signal data, or the like to the server(s) 120 which thus obtains (150) the wireless signal data (or processes raw data from the device(s) 110 to obtain the wireless signal data) and then performs steps 152-158. In another configuration the device(s) 110 may perform steps 150-154 and may determine what change in user activity occurred and may send to the server an indication of the change in user activity (along with an indication of the area 20, the time period, the user, and/or other data), and the server(s) 120 may identify (156) the command and cause (158) the command to be executed. Various other combinations of operations may be allocated between the device(s) 110 and the server(s) 120.

As noted above, in order to train a model to be used for runtime determination of human activity, the system may obtain a collection of training examples where each training example includes at least sample wireless signal data and a ground truth indication of the user activity during the time window associated with the wireless signal data. The ground truth indication that tells what the user is doing during the time window may be manually created or may be created by the system by analyzing other data such as image data (particularly for a training area that may be equipped with cameras or other sensors). The training data may be determined using automated or semi-automated processes depending on available training environment(s) and system configuration.

The training data may be based on a particular configuration of room, access point, or other devices. While one particular configuration may be illustrated here, the system may train many different models with each model corresponding to a particular configuration. The system may then deploy the appropriate model to a device in the corresponding configuration for purposes of human activity detection. For example, a user may indicate how many devices are in a home, room, or other area as well as other information that may indicate the particular configuration of the user's space. The system may then send a local device (or may store an indication) that the user's space corresponds to a particular area and may activate the particular model for that user's particular space.

An example configuration is shown in FIG. 2A. As shown an area 20 may have multiple rooms, room 1 202, room 2 204 and room 3 206. To train a model to detect human activity the system may receive wireless signal data from one or more device(s) 110. The wireless signal data may signal data (or used raw) in a similar manner to the operations that happen during training so the model uses the same type of data at runtime as was used to train the model.

In one example, the system may use wireless data captured by a receiver or other component of device(s) 110. For example, device(s) 110 in an area may capture CSI data from Wi-Fi beacon signals sent by AP 105. The wireless signals received by the device 110 when a user is moving slowly in the area exhibit different characteristics than the wireless signals received by the device 110 when a user is not moving (or is moving quickly) in an area. In one example, the system may use 200 CSI samples per second (a rate of 200 Hz). Out of total 30 subcarriers, the system may use 15 subcarrier in the middle of the subcarrier range. Two second worth of wireless data may be incorporated as training data for a particular time period for the training corpus. Thus, a total of 400 CSI captures (from 15 subcarriers) (400*15) may be used. In the chart below, this data set may be referred to as an image. Two seconds worth of data may be selected to capture any human motion that may be occurring during that time period. Thus, as an example, the system may capture training data as follows:

| 0~2 sec (1st set of image) | | | | | 2~4 sec (2nd set of image) | | | | | 4~6 sec (3rd set of image) | | | | | |
|---|---|---|---|---|---|---|---|---|---|---|---|---|---|---|---|
| CSI1 | CSI2 | CSI3 | ... | CSI400 | CSI1 | CSI2 | CSI3 | ... | CSI400 | CSI1 | CSI2 | CSI3 | ... | CSI400 | ... |
| Sc8 | Sc8 | Sc8 | Sc8 | Sc8 | Sc8 | Sc8 | Sc8 | Sc8 | Sc8 | Sc8 | Sc8 | Sc8 | Sc8 | Sc8 | ... |
| Sc9 | Sc9 | Sc9 | Sc9 | Sc9 | Sc9 | Sc9 | Sc9 | Sc9 | Sc9 | Sc9 | Sc9 | Sc9 | Sc9 | Sc9 | ... |
| Sc10 | Sc10 | Sc10 | Sc10 | Sc10 | Sc10 | Sc10 | Sc10 | Sc10 | Sc10 | Sc10 | Sc10 | Sc10 | Sc10 | Sc10 | ... |
| ... | ... | ... | ... | ... | ... | ... | ... | ... | ... | ... | ... | ... | ... | ... | ... |
| Sc23 | Sc23 | Sc23 | Sc23 | Sc23 | Sc23 | Sc23 | Sc23 | Sc23 | Sc23 | Sc23 | Sc23 | Sc23 | Sc23 | Sc23 | ... | include a variety of different data obtained from the wireless receiver(s) of device(s) 110. In one example, the wireless signal data may include Wi-Fi channel state information (CSI) collected from device(s) 110. The CSI may be determined by activities of the transmitter (Tx) and receiver (Rx) of different device(s) 110. For example, a device 110 may be located in room 2 204. Other devices may also be located in other rooms. The system may wish to classify the user's activity in one of a number of potential types of activity. As an example, the system may wish to classify user activity into one of four categories: (0) Idle—meaning no user is present, (1) Static—meaning a user is present but is not moving or moving very little, for example a user is sitting, lying down, or standing but stationary, (2) Slow—meaning a user is moving but slowly such as a user is walking in the room, doing dishes, cleaning, or doing some other standing/slow moving activity, or (3) Fast—meaning a user is moving more quickly than in category 3, such as running on a treadmill, running through the room, exercising, jumping, etc.

Figure 2B:
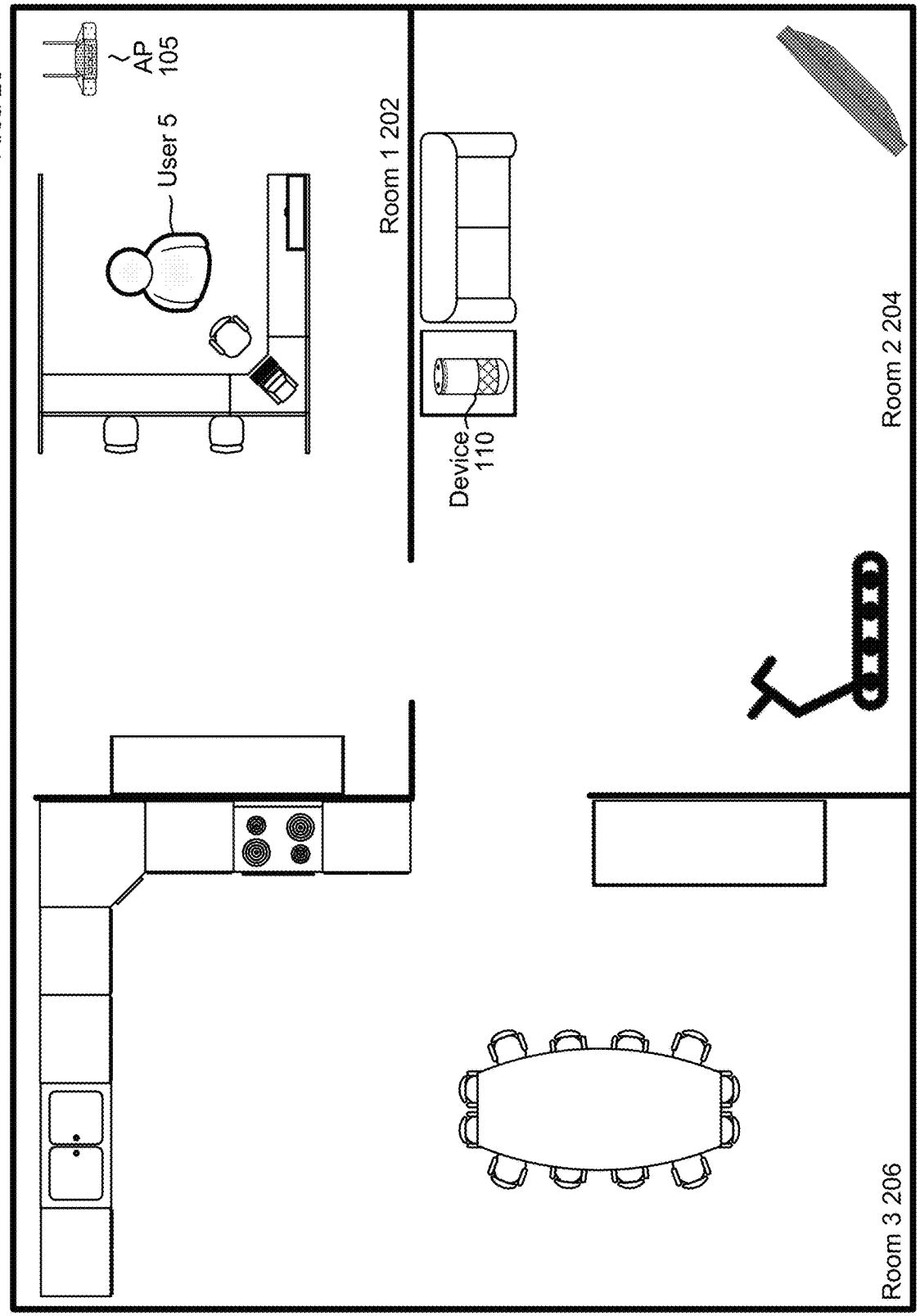

For example, FIG. 2A shows the activity category of Idle, where no user is present. FIG. 2B shows the activity category of Static, where a user 5 is present at area 20, but not moving. FIG. 2C shows the activity category of Slow, where a user 5 is present at area 20 and moving, but slowly, for example walking within room 3 206. FIG. 2D shows the activity category of Fast where a user 5 is running on a treadmill in room 2 204. For each activity category, during training the system may collect training wireless data to determine how a certain activity is reflected in wireless data given the room configuration. That training wireless data and corresponding ground truth data may be used to train the model that will be used at runtime. At runtime, the wireless data obtained at runtime may be processed into wireless The raw beacon/CSI data may not be as clean as desired due to hardware irregularities, Wi-Fi protocol data, or other data that is not necessarily relevant to determining human activity. The system may therefore perform filtering to remove noise-like aspects from the data to avoid such noise impacting the machine learning training and/or runtime decisions. For example, the system may apply an infinite impulse response (IIR) or other filter to the data as follows:

$$y(n) = \frac{1}{a_0}\left(\sum_{i=0}^{I} b_i x[n-I] - \sum_{j=1}^{J} a_j y[n-J]\right)$$

where I is the feedforward filter order, $b_i$ are the feedforward filter coefficients, J is the feedback filter order, $a_j$ are the feedback filter coefficients, x(n) is the input signal (e.g., raw data) and y(n) is the output signal (e.g., filtered data). The amount of de-noising during training may correspond to the ability of devices during runtime to performing similar de-noising. For example, a high order filter may result in better performance but may require more CPU performance at runtime. The filtering performed during training may correspond to the filtering performed at runtime to ensure proper performance.

Other operations may be performed on the data. For example, time interpolation may be applied. As CSI information is transferred via radio frequency (RF) transmission, packet duration may not be equally-spaced. By applying interpolation in time domain the system may obtain a better IIR result using a low order tap. Alternatively, a high number of taps or other de-noising skill such as Moving average, Median Filter or Eigen value decomposition may be used. The system may also apply a discrete cosine transform (DCT) which may be used to extract low frequency features as indications of human activity may be concentrated in low frequencies.

Figure 3:
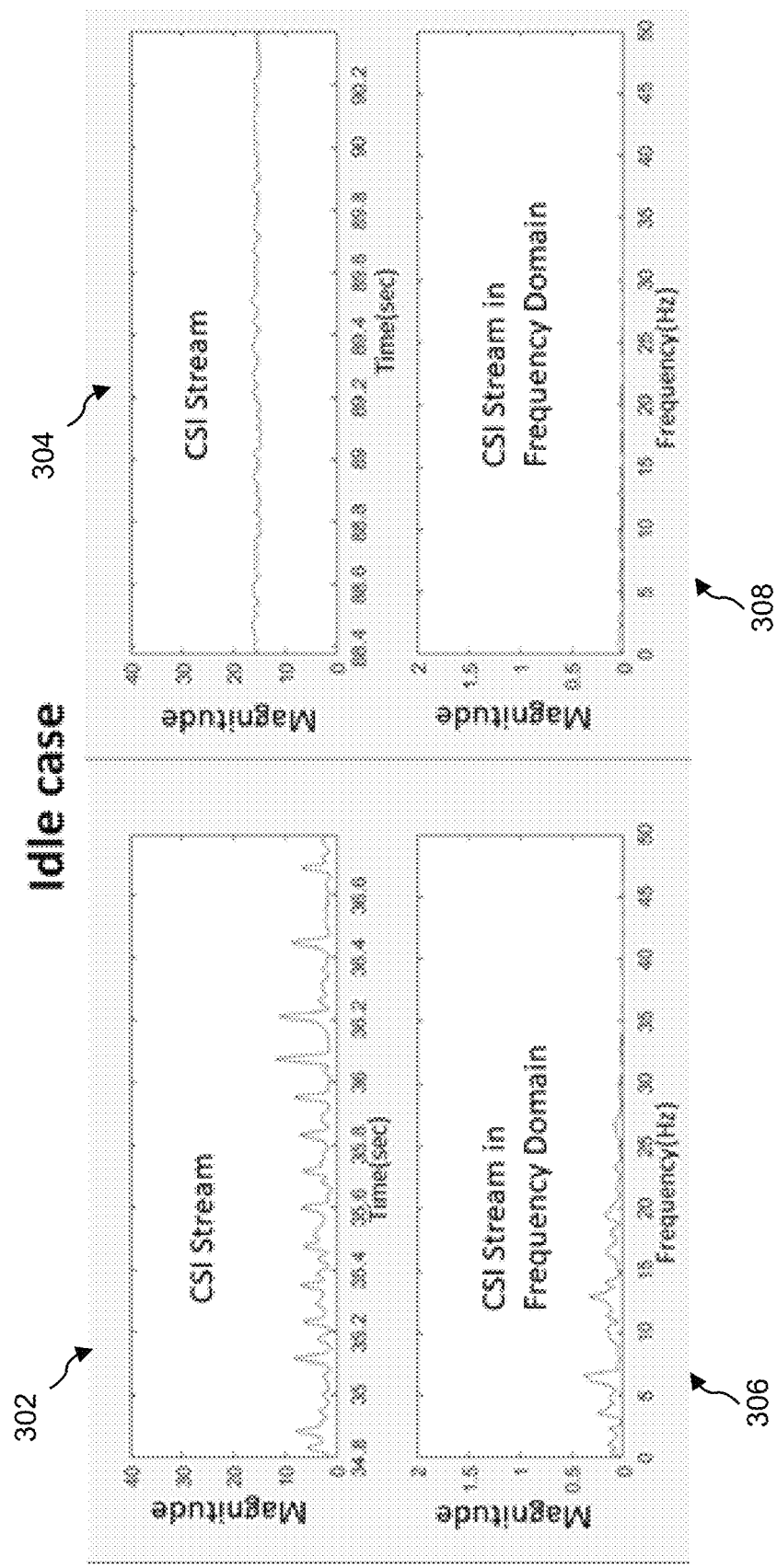
FIG. 3 illustrates wireless signal data for an idle state of human activity according to embodiments of the present disclosure.
Figure 4:
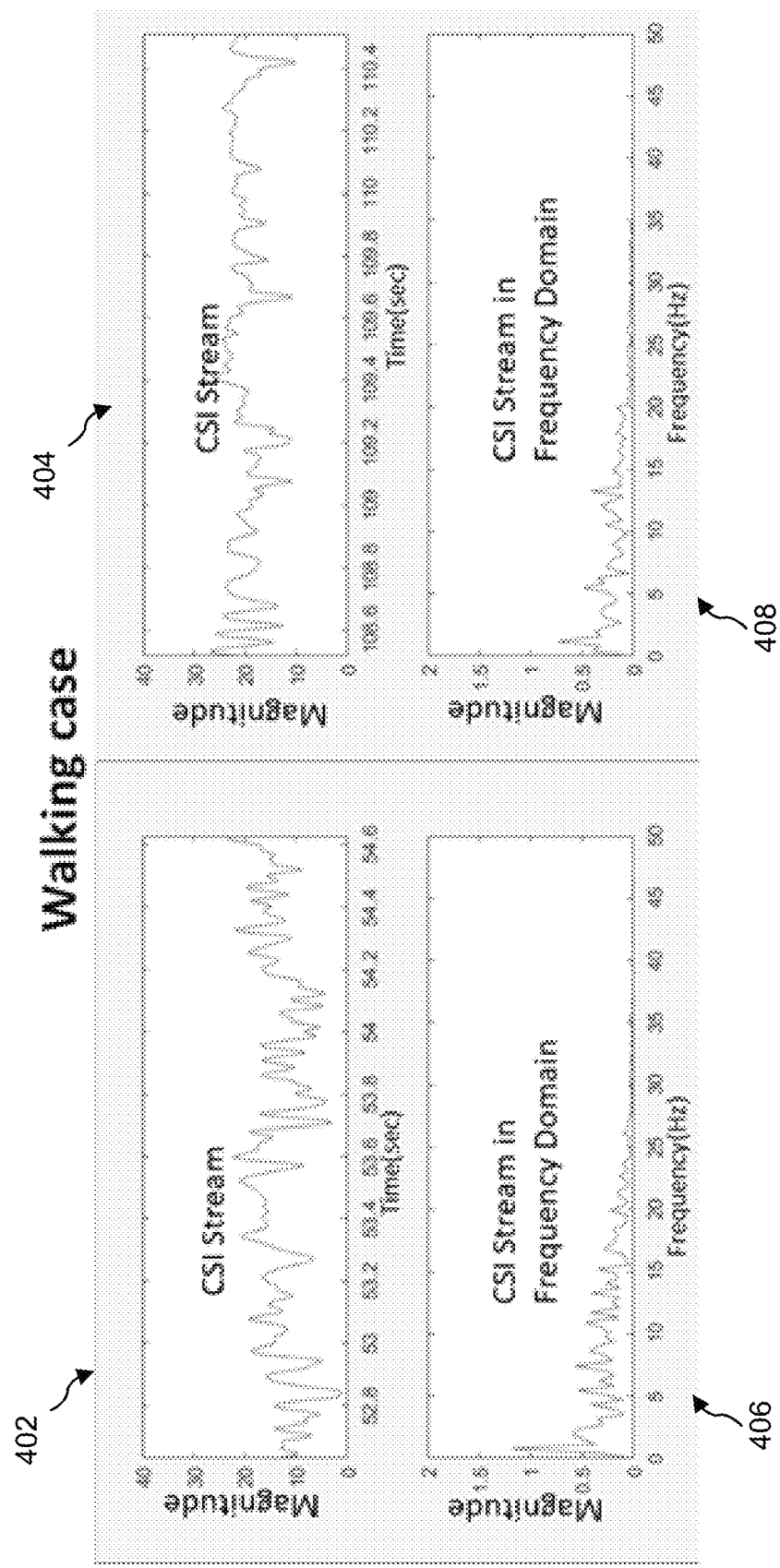
FIG. 4 illustrates wireless signal data for a walking state of human activity according to embodiments of the present disclosure.

The system may also convert time-domain data into frequency domain data using a Fourier transform, fast Fourier transform (FFT) or other operation. Using wireless signal data in the frequency domain may provide more useful data for the system to use for purposes of determining transitions in human activity. For example, as shown in FIG. 3, the CSI for an idle case (e.g., user in a room but not moving) is plotted both in the time domain (302 and 304) and in the frequency domain (306 and 308). Thus, the two second CSI stream for each relevant subcarrier may be transformed using an FFT. The system may also remove a DC component as the DC component may have significant energy which can lead to errors in machine learning operations. Chart 302 shows the time domain CSI for the idle case in an noisy environment (and chart 308 shows the resulting frequency domain plot) while chart 304 shows the time domain CSI for the idle case in a less noisy environment (and chart 306 shows the resulting frequency domain plot). As shown in FIG. 4, chart 402 shows the time domain CSI for the walking case when a user is walking a certain speed (and chart 408 shows the resulting frequency domain plot) while chart 404 shows the time domain CSI for the walking case when the user is walking a slower speed (and chart 406 shows the resulting frequency domain plot). As can be seen, a common feature for the idle case is that its power spectrum concentrates on the low frequency, especially DC. However, in contrast, the power spectrum in the walking case spans from a second frequency bin up to 30 Hz. The magnitude of power spectrum in walking case can be 2-3 times larger than it is in the idle case.

Using the data captured during different activity types, the system may process the data to determine certain observable features such as a multipath fading reference value, Doppler spread reference value, other CSI data, or other wireless signal data features known in the art. Different observable ranges of those features may be cataloged to map a probability that certain observable features of the wireless signal data correspond to different human activities. For example, the system may group the determined multipath fading (MF) reference values into three different categories, MF1, MF2, and MF3. Each such category may represent a sequence of MF reference values observed by the device during a particular time window. The system may measure a series of MF reference values and determine which category the sequence belongs to. Similarly, the system may group the Doppler spread (DS) reference values into three different categories, DS1, DS2, and DS3. Each such category may represent a sequence of DS reference values observed by the device during a particular time window. The system may measure a series of DS reference values and determine which category the sequence belongs to. (Other wireless signal data types and/or number of categories are also possible depending on system configuration.) The system may then group the different combinations of feature data as follows:

| Observable Information | Multipath Fading Reference Values | | |
|---|---|---|---|
| Doppler Spread Reference Values | (MF1, DS1) | (MF2, DS1) | (MF3, DS1) |
| | (MF1, DS2) | (MF2, DS2) | (MF3, DS2) |
| | (MF1, DS3) | (MF2, DS3) | (MF3, DS3) | where each combination of feature data bin is illustrated. Based on all the training examples, and how often each combination is seen with each particular activity type, the system may have a probability of matching the observed feature data combination with the particular type of human activity. This may be known as the output probability.

For example, combination (MF1, DS1) may correspond to a 0.2 probability for the idle state, 0.1 probability for the static state, 0.3 probability for the slow state and 0.4 probability for the fast state. Thus the first combination (MF1, DS1) may correspond to a group of probabilities of $\{pS_0=0.2, pS_1=0.1, pS_2=0.3, pS_3=0.4\}$, which may be expressed as $\{0.2, 0.1, 0.3, 0.4\}$ or $P_1$. The other combinations may correspond to their own groups of probabilities, e.g., (MF1, DS2) may correspond to $P_2$ (MF1, DS3) may correspond to $P_3$, and so forth. The groups of probabilities may be determined using the training data and determining what ground truth activity levels correspond to the training examples exhibiting the particular combination of wireless signal data.

Further, groups of probabilities may be determined for other wireless signal data examples in addition to/in alternative to the MF/DS combinations. In this manner, a variety of wireless signal data may be processed during training to determine correspondence between wireless signal data and different probabilities. Thus different output probability/wireless signal data associations may be determined during training.

The output probability may be used as a parameter to the model, for example to a Hidden Markov Model (HMM) that may determine transitions between activity states using the wireless signal data. The HMM may also rely on a transition probability, that represents a likelihood of a user going from one activity state to another (which may depend on the data in the training corpus. For example, the training data may indicate how often a human enters a room, sits down on a chair, stands up, goes to bed or exits the room. Such activities may all be connected sequentially. For example, a human cannot lay down on the bed without first entering the room. These activities may be represented in states in the HMM and changes in activity regarded as a transition of states within the HMM. The transition probabilities may be determined using the training data set.

Figure 5:
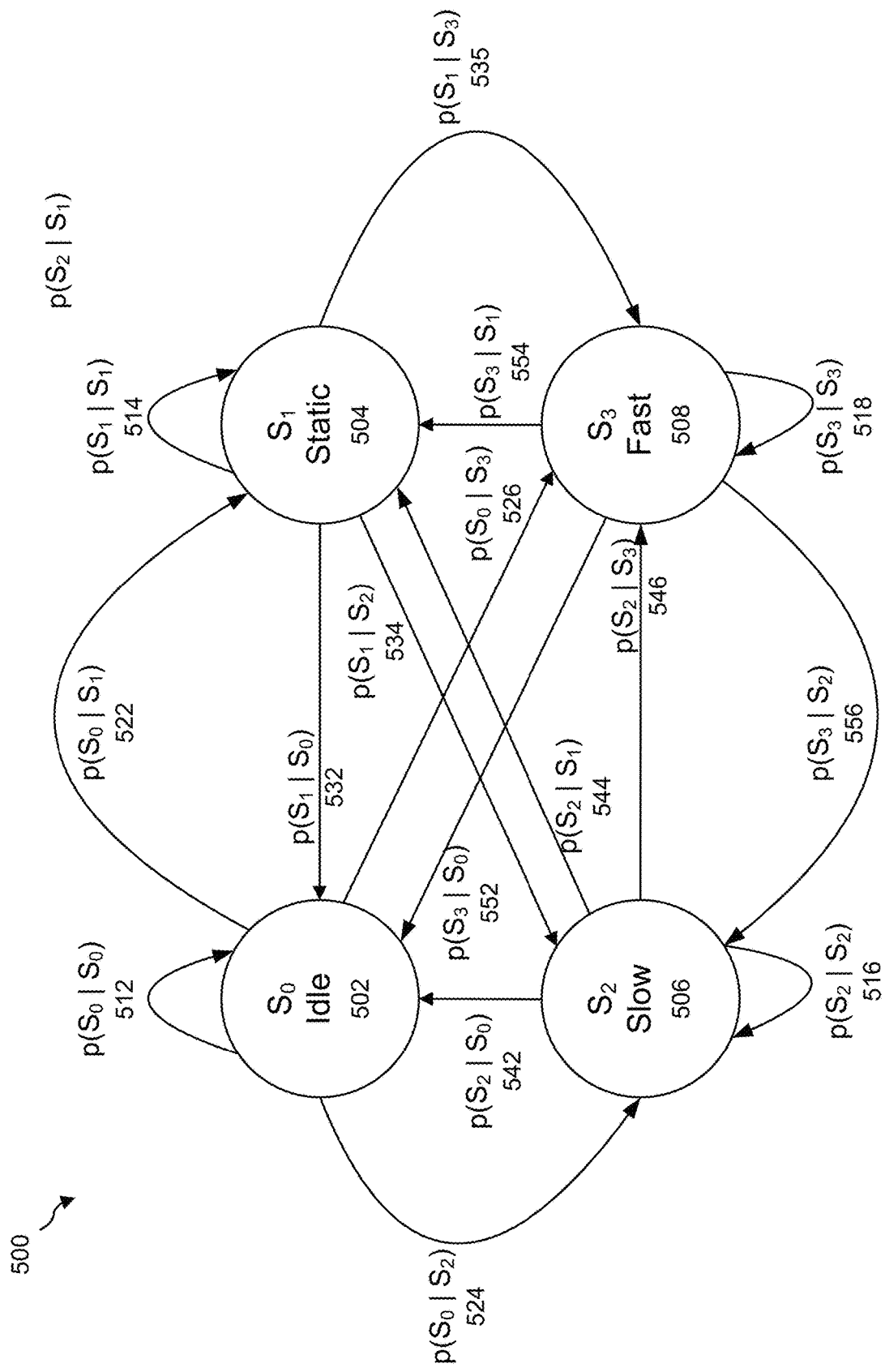
FIG. 5 illustrates a state diagram for tracking human activity according to embodiments of the present disclosure.

FIG. 5 illustrates a state diagram 500 that the system may determine for an HMM that may include a plurality of probabilities that may represent transition probabilities that are determined during the training period to configure the HMM. The number of states (and corresponding transition arcs and corresponding probabilities) is configurable and may change depending on system configuration. As shown, there are four states represented that correspond to the states discussed above, in particular state 0 ($S_0$)—Idle 502, state 1 ($S_1$)—Static 504, state 2 ($S_2$)—Slow 506, state 3 ($S_3$)—Fast 508. A number of different probabilities may be determined based on the training data where the probabilities represent a certain probability that the HMM will determine a transition from one state to another given certain wireless signal data.

For example, $p(S_0|S_1)$ 522 represents the probability that given a current state ($S_0$) 502 that the HMM will transition to state 1 ($S_1$) 504. Other probabilities illustrated in FIG. 5 represent the probability of other state transitions or probabilities that the state remains unchanged (for example, $p(S_0|S_0)$ 512 represents the probability that given a current state ($S_0$) 502 does not change). The probabilities of state transitions (or state non-transitions) may depend on the observations of the wireless signal data from the training data.

Thus, a particular HMM λ may be defined as a function of the transition probability (A), output probability (B), and the initial probability (π) such that λ=(A, B, π). The transition probability (A) may be represented by the probabilities illustrated in FIG. 5. The output probability (B) may represent different probabilities that correspond to the wireless signal data, e.g., output probability (B) may be the particular probability in the plurality of probabilities corresponding to the wireless signal data observed for the particular time window. The observation X may be the wireless signal data represented above where observation matrix X includes different points of wireless signal data x measured at different times, such that X=($x_1$, $x_2$, $x_3$ ... $x_T$), where a group of wireless signal data taken over a time period (e.g., 1 second, 2 seconds, etc.) may be used to create the observation/wireless signal data X (with wireless signal data at time 1 referred to as $x_1$, wireless signal data corresponding to time 2 referred to as $x_2$, and so forth) processed at runtime. The wireless signal data may correspond to various data including CSI data, one or more multipath fading reference values, one or more Doppler spread reference values, and/or other data, For example, if the wireless signal data corresponds to (MF1, DS1), the output probabilities may be expressed as {0.2, 0.1, 0.3, 0.4}, with the individual probability selected for potential next state as appropriate. Thus the system may use the wireless signal data (e.g., multipath fading reference values, one or more Doppler spread reference values, or the like) to determine probabilities corresponding to a next state from a current state. The initial probability (n) corresponds to the initial state probability that may also be determined from training data or may be equal for each state depending on the system configuration. The initial probability may not be used by the model beyond an initial state setting during a determination of user activity.

To estimate the mostly likely current state given a particular observation X, the system processes the wireless signal data using the model λ to determine a probability of a transition to a next state, representing a transition in activity type of the user in the area. For example, in one situation a current state may be $S_0$=idle. The transition probabilities to different states from $S_0$ may be p($S_0|S_0$) 512=0.4, p($S_0|S_1$) 522=0.2, p($S_0|S_2$) 524=0.3, p($S_0|S_3$)=0.1. The system may determine wireless signal data for an area and a time window (e.g., (MF1, DS1)) and may determine output probabilities for that wireless signal data (e.g., {0.2, 0.1, 0.3, 0.4}). The system may then calculate an adjusted probability as transition probability times output probability for each state. Thus, the adjusted probability for the next state (where the current state is $S_0$) may be represented as:

For $S_0$=0.4 (the transition probability from $S_0$ to $S_0$)*0.2 (the output probability corresponding to $S_0$)=0.08
For $S_1$=0.2 (the transition probability from $S_0$ to $S_1$)*0.1 (the output probability corresponding to $S_1$)=0.02
For $S_2$=0.3 (the transition probability from $S_0$ to $S_2$)*0.3 (the output probability corresponding to $S_2$)=0.09
For $S_3$=0.1 (the transition probability from $S_0$ to $S_3$)*0.4 (the output probability corresponding to $S_3$)=0.04

The adjusted probabilities may also be normalized or otherwise processed to ease comparison between adjusted probabilities. The system may then select the highest adjusted probability and thus determine that the next state corresponds to the highest adjusted probability, for example $S_2$ in the example above. Thus the system may determine that the human activity in the area transitioned from idle (e.g., $S_0$) to slow (e.g., $S_2$) during the time window.

The system may create a number of different HMMs/trained models depending on the configuration of devices in an area. For example, in one configuration the system may have access to wireless data from only one device 110 in an area. In another configuration the system may have access to wireless data from multiple devices 110 in an area. The system may thus create different training sets and different resulting trained models depending on configuration. Prior to runtime, the system may determine (either through user settings, automated determinations or other techniques) the appropriate configuration for an area 20 and may activate the HMM/trained model corresponding to that area.

Each HMM may be trained with output probabilities and initial probabilities using the training examples using ground truth data and wireless signal data. At runtime, the system may obtain (150) the wireless signal data (e.g., processing raw wireless data captured by device(s) 110 into a form usable by the HMM), use (152) the wireless signal data to determine a probability that a user activity has changed from a first type to a second type (e.g., a probability that an HMM state has changed as illustrated in FIG. 5), and determine (154), using the probability, that the activity has changed. The system may then identify (156) a command corresponding to the new activity (e.g., running, sitting, etc.) and cause (158) the command to be executed.

Figure 6:
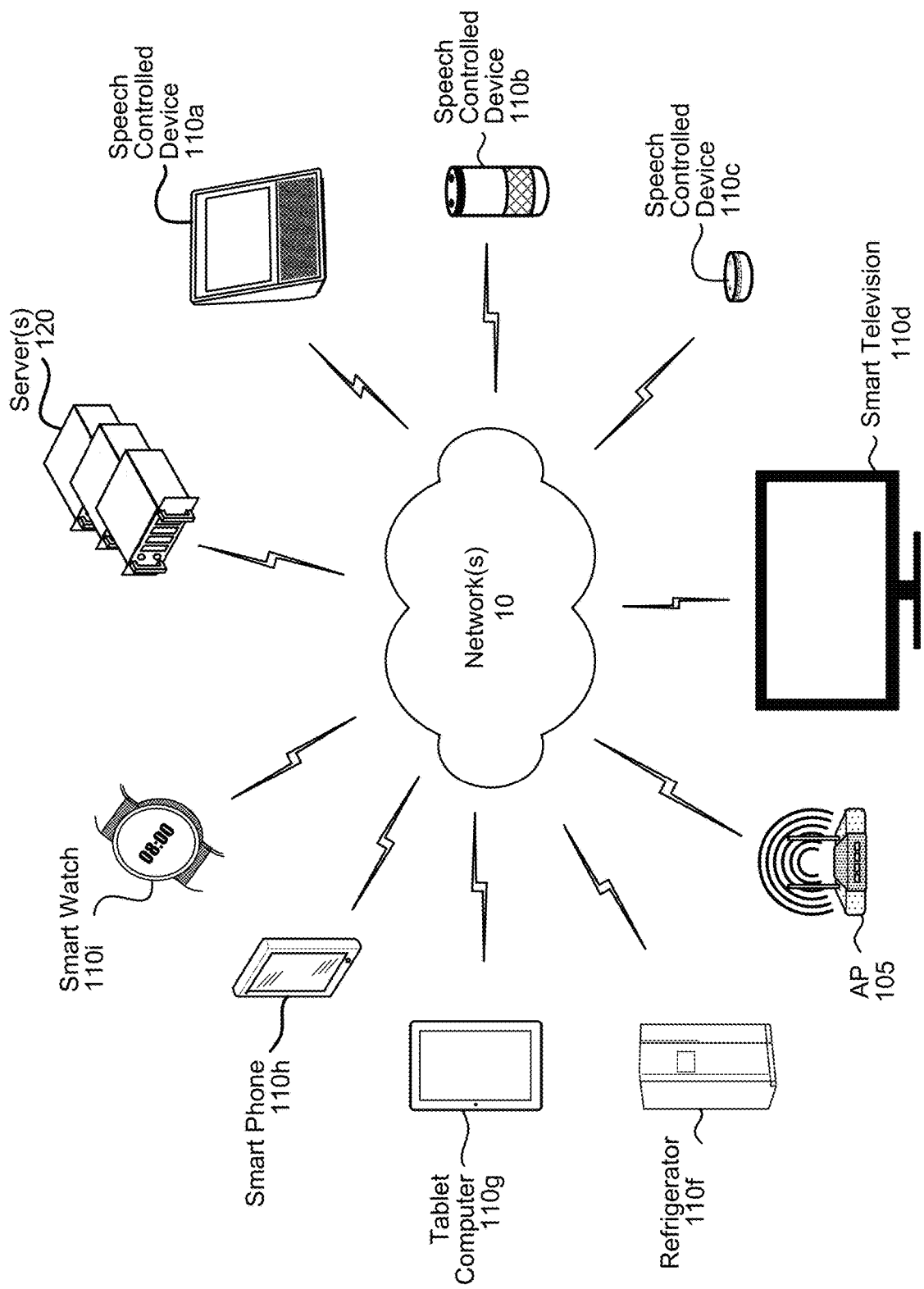
FIG. 6 is a diagram illustrating example components according to embodiments of the present disclosure.

FIG. 6 is a network diagram illustrating example components according to embodiments of the present disclosure. As illustrated in FIG. 13 devices 110 may contain components of the system 100 and may be connected over network(s) 10. The network(s) 10 may be a local or private network or may be part of a wider network. For example, the network(s) 10 may include a wired local area network (LAN), a wireless local area network (WLAN) (such as WiFi), Bluetooth, and/or wireless network, such as a Long Term Evolution (LTE) network, WiMAX network, 3G network, etc.

Devices 110 may be connected to the network(s) 10 through either wired or wireless connections. For example, a first speech controlled device 110a, a second speech controlled device 110b, a third speech controlled device 110c, a smart television 110d, a wireless access point 105, a refrigerator 110f, a tablet computer 110g, a smart phone 110h, and/or a smart watch 110i may be connected to the network(s) 10 through a wired and/or wireless connection. Thus, while the examples illustrated above are sometimes directed to the speech-controlled devices 110a-110c, the disclosure is not limited thereto and the device 110 may be any device configured to send data to the server(s) 120 via the network(s) 10.

The system may be configured to incorporate user permissions and may only perform activities disclosed herein if approved by a user. For example, the system may only determine activity transitions using wireless signal data and cause execution of certain commands in a manner consistent with user permissions.

The model(s) of the system used to determine a transition of user activity or perform other operations discussed above may be trained and operated according to various machine learning techniques. Such techniques may include, for example, neural networks (such as deep neural networks and/or recurrent neural networks), inference engines, trained classifiers, HMMs, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories (e.g., spam activity or not spam activity), an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category. In an example, the one or more machine learned models implemented by the user recognition component 395 may be trained with positive examples of speech received from users of known ages.

In order to apply machine learning techniques, machine learning processes themselves need to be trained, for example as discussed above. Training a machine learning component requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

FIGS. 7A-7B are block diagrams conceptually illustrating example components of the system 100. In operation, the system 100 may include computer-readable and computer-executable instructions that reside on the device 110, AP 105 and/or the server(s) 120, as will be discussed further below.

The device 110 may include one or more audio capture device(s), such as a microphone 112 or an array of microphones 112. The audio capture device(s) may be integrated into the device 110 or may be separate. The device 110 may also include an audio output device for producing sound, such as loudspeaker(s) 114. The audio output device may be integrated into the device 110 or may be separate. In some examples the device 110 may include a display 116, but the disclosure is not limited thereto and the device 110 may not include a display or may be connected to an external device/display without departing from the disclosure.

The device 110, AP 105 and/or the server(s) 120 may include an address/data bus 724 for conveying data among components of the device 110 and/or the server(s) 120. Each component within the device 110 and/or the server(s) 120 may also be directly connected to other components in addition to (or instead of) being connected to other components across the bus 724.

The device 110, AP 105 and/or the server(s) 120 may include one or more controllers/processors 704, which may each include a central processing unit (CPU) for processing data and computer-readable instructions, and a memory 706 for storing data and instructions. The memory 706 may include volatile random access memory (RAM), non-volatile read only memory (ROM), non-volatile magnetoresistive (MRAM) and/or other types of memory. The device 110, AP 105 and/or the server(s) 120 may also include a data storage component 708, for storing data and controller/processor-executable instructions. The data storage component 708 may include one or more non-volatile storage types such as magnetic storage, optical storage, solid-state storage, etc. The device 110, AP 105 and/or the server(s) 120 may also be connected to removable or external non-volatile memory and/or storage (such as a removable memory card, memory key drive, networked storage, etc.) through the input/output device interfaces 702.

Computer instructions for operating the device 110, AP 105 and/or the server(s) 120 and its various components may be executed by the controller(s)/processor(s) 704, using the memory 706 as temporary "working" storage at runtime. The computer instructions may be stored in a non-transitory manner in non-volatile memory 706, storage 708, or an external device. Alternatively, some or all of the executable instructions may be embedded in hardware or firmware in addition to or instead of software.

The device 110, AP 105 and/or the server(s) 120 includes input/output device interfaces 702. A variety of components may be connected through the input/output device interfaces 702, such as the microphone array 112, the loudspeaker(s) 114, and/or the display.

The input/output device interfaces 702 may also include an interface for an external peripheral device connection such as universal serial bus (USB), FireWire, Thunderbolt or other connection protocol. The input/output device interfaces 702 may also include a connection to one or more networks 10 for example via an Ethernet port or through antenna(s) 714, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. The input/output device interfaces 702 may also include a receiver (Rx), transmitter (Tx), transceiver and/or other communication components to detect, send, and process wireless signals.

The AP 105 may be configured to route data between the network and other devices, such as a device 110. The AP 105 may be configured to operate a wireless network such as a wireless local area network (WLAN) (such as WiFi under IEEE 802.11), Bluetooth, ZigBee, or other wireless network. Wireless signals sent by the AP 105 may be detected by the device 110 and processed for purposes of determining wireless signal data that may be processed using the trained model discussed above to determine a transition in human activity.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
    detecting, during a first time period and using a first device in an area, a first wireless beacon signal sent by an access point;
    determining first channel state information (CSI) data using the first wireless beacon signal;
    processing the first CSI data using a trained model such that a first output of the trained model indicates a first probability that the first CSI data corresponds to a human being stationary in the area;
    detecting, during a second time period and using the first device, a second wireless beacon signal sent by the access point;
    determining second CSI data using the second wireless beacon signal;
    processing the second CSI data using the trained model such that a second output of the trained model indicates a second probability, based at least in part on the first CSI data, that the second CSI data corresponds to the human moving in the area, wherein the second wireless beacon signal exhibits a different characteristic than the first wireless beacon signal;
    determining, based at least in part on the second probability, that the different characteristic was caused by the human moving in the area;
    identifying a command corresponding to human movement and the area; and
    causing the command to be executed.

2. The computer-implemented method of claim 1, wherein processing the first CSI data using the trained model comprises:
    processing the first CSI data to determine at least one multipath fading reference value and at least one Doppler spread reference value; and
    processing the at least one multipath fading reference value and the at least one Doppler spread reference value using the trained model to determine the first output.

3. The computer-implemented method of claim 1, further comprising:
    detecting, during the second time period and using a second device, a third wireless beacon signal sent by the access point, wherein the second device is in the area;
    determining third CSI data using the third wireless beacon signal; and
    processing the third CSI data using the trained model to determine the second probability.

4. A computer-implemented method comprising:
    obtaining wireless signal data corresponding to an area and a first time period, the wireless signal data corresponding to a wireless signal detected by a first device;
    processing at least the wireless signal data using a trained model such that a first output of the trained model indicates a first probability, based at least in part on the wireless signal data, that a change in physical activity by a human occurred in the area during the first time period and caused a fluctuation in the wireless signal;
    determining, based at least in part on the first probability, that the fluctuation was caused by a transition, by the human, from a first physical activity to a second physical activity;
    determining output data corresponding to the second physical activity;
    determining a user account corresponding to the first device
    identifying a command associated with the user account and
    causing the command to be executed at least by sending an instruction to a second device associated with the user account to execute the command.

5. The computer-implemented method of claim 4, wherein
    obtaining the wireless signal data comprises receiving the wireless signal data from a third device.

6. The computer-implemented method of claim 4, wherein the wireless signal data corresponds to channel state information (CSI) data determined from a beacon sent by an access point.

7. The computer-implemented method of claim 6, wherein determining the first probability further comprises:
    processing the CSI data to determine at least one multipath fading reference value;
    processing the CSI data to determine at least one Doppler spread reference value; and
    processing the at least one multipath fading reference value and the at least one Doppler spread reference value to determine the first output.

8. The computer-implemented method of claim 4, wherein the wireless signal data is generated by a first device and the method further comprises:
    obtaining second wireless signal data from a second device, the second wireless signal data corresponding to the area and to the first time period,
    wherein determining the first output further comprises using the second wireless signal data to determine the first output.

9. The computer-implemented method of claim 4, further comprising:
    processing wireless signal data corresponding to a second time period using the trained model to determine the first output, wherein the second time period is before the first time period.

10. The computer-implemented method of claim 4, further comprising:
    processing at least the wireless signal data using the trained model to determine a second probability, based at least in part on the wireless signal data, that the change in physical activity by the human did not occur in the area during the first time period; and
    determining that the first probability is greater than the second probability.

11. The computer-implemented method of claim 4, wherein the first physical activity corresponds to movement in the area at a first speed and the second physical activity corresponds to movement in the area at a second speed faster than the first speed.

12. A system, comprising:
   at least one processor; and
   at least one memory including instructions that, when executed by the at least one processor, cause the system to:
   obtain wireless signal data corresponding to an area and a first time period, the wireless signal data corresponding to a wireless signal detected by a first device;
   process at least the wireless signal data using a trained model such that a first output of the trained model indicates a first probability, based at least in part on the wireless signal data, that a change in physical activity by a human occurred in the area during the first time period and caused a fluctuation in the wireless signal;
   determining, based at least in part on the first probability, that the fluctuation was caused by a transition, by the human, from a first physical activity to a second physical activity;
   determine output data corresponding to the second physical activity;
   determine a user account corresponding to the first device;
   identify a command associated with the user account; and
   cause the command to be executed at least by sending an instruction to a second device associated with the user account to execute the command.

13. The system of claim 12, wherein obtaining the wireless signal data comprises receiving the wireless signal data from a third device.

14. The system of claim 12, wherein the wireless signal data corresponds to channel state information (CSI) data determined from a beacon sent by an access point.

15. The system of claim 14, wherein the at least one memory includes additional instructions that, when executed by the at least one processor, further cause the system to:
   process the CSI data to determine at least one multipath fading reference value;
   process the CSI data to determine at least one Doppler spread reference value; and
   process the at least one multipath fading reference value and the at least one Doppler spread reference value to determine the first output.

16. The system of claim 12, wherein the wireless signal data is generated by a third device and wherein the at least one memory includes additional instructions that, when executed by the at least one processor, further cause the system to:
   obtain second wireless signal data from a fourth device, the second wireless signal data corresponding to the area and to the first time period; and
   use the second wireless signal data to determine the first output.

17. The system of claim 12, wherein the at least one memory includes additional instructions that, when executed by the at least one processor, further cause the system to:
   process wireless signal data corresponding to a second time period using the trained model to determine the first output, wherein the second time period is before the first time period.

18. The system of claim 12, wherein the first physical activity corresponds to movement in the area at a first speed and the second physical activity corresponds to movement in the area at a second speed faster than the first speed.

19. The computer-implemented method of claim 4, further comprising:
   determining, based at least in part on the first probability, that the fluctuation corresponds to the human entering a room.

20. The computer-implemented method of claim 4, further comprising:
   determining, based at least in part on the first probability, that the first physical activity corresponds to the human being static and the second physical activity corresponds to the human walking.

* * * * *